(12) United States Patent
Luo et al.

(10) Patent No.: US 7,051,021 B1
(45) Date of Patent: May 23, 2006

(54) PARALLEL MOVING AGGREGATE COMPUTATION

(75) Inventors: Gang Luo, Madison, WI (US); Ambuj Shatdal, Madison, WI (US)

(73) Assignee: NCR Corp., Dayton, OH (US)

( * ) Notice: Subject to any disclaimer, the term of this patent is extended or adjusted under 35 U.S.C. 154(b) by 0 days.

(21) Appl. No.: 11/037,799

(22) Filed: Jan. 18, 2005

Related U.S. Application Data (63) Continuation of application No. 09/946,261, filed on Sep. 5, 2001, now abandoned.

(51) Int. Cl.
*G06F 17/30* (2006.01)

(52) U.S. Cl. .................. 707/4; 707/2; 707/5; 707/102; 707/104.1

(58) Field of Classification Search .............. None
See application file for complete search history.

(56) References Cited

U.S. PATENT DOCUMENTS

| | | | |
|---|---|---|---|
| 5,546,570 A | 8/1996 | McPherson et al. | |
| 5,850,547 A | 12/1998 | Waddington et al. | |
| 5,977,973 A | 11/1999 | Sobeski et al. | |
| 6,081,801 A | 6/2000 | Cochrane et al. | |
| 6,275,818 B1 | 8/2001 | Subramanian et al. | |
| 6,505,187 B1 * | 1/2003 | Shatdal ........................ | 707/2 |
| 6,567,803 B1 * | 5/2003 | Ramasamy et al. ............ | 707/4 |

OTHER PUBLICATIONS

Jaedicke et al., "On parallel processing of aggregate and Scalar functions", ACM, 1998.*
Oracle9i "data catridge developer's guide", Release 2 (9.2).*
Wilburt Juan Labio et al., "Performance Issues in Incremental Warehouse Maintenance," Proceedings of the 26th VLDB Conference, pp. 461-472 (2000).
J.N. Gray et al., "Granularity of Locks and Degrees of Consistency in a Shared Data Base," pp. 175-193 (dated before the filing date of the present application).
Richard Winter, "Intelligent Enterprise: SQL-99's New OLAP Functions," pp. 1-7 (Jan. 2000).
Ambuj Shatdal, "Order Based Analysis Functions in NCR Teradata Parallel RDBMS," EDBT, pp. 219-223 (2000).

* cited by examiner

*Primary Examiner*—Jean M. Corrielus
(74) *Attorney, Agent, or Firm*—Trop, Pruner & Hu P.C.

(57) ABSTRACT

A method and apparatus is provided in a parallel database system having a plurality of nodes for computing a moving aggregate of an attribute of a relation having multiple tuples. Portions of the relation are distributed across the plurality of nodes of the database system. For each node i, the database system identifies one or more other nodes that contain tuples of the relation which are covered by a moving window of each tuple of the relation at node i. For each such identified node, a value representing an aggregate of the tuples at each such identified node is communicated to node i. The moving aggregate is then calculated using at least tuples of the relation at node i as well as the value from each of the identified one or more nodes.

22 Claims, 7 Drawing Sheets

PARALLEL MOVING AGGREGATE COMPUTATION

CROSS-REFERENCE TO RELATED APPLICATIONS

This is a continuation of U.S. Ser. No. 09/946,261, entitled "Parallel Moving Aggregate Computation," filed Sep. 5, 2001, now abandoned which is hereby incorporated by reference.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database-query language (e.g., Structure Query Language or SQL) are used.

A table (also referred to as a relation) is made up of multiple rows (also referred to as tuples). Each row (or tuple) includes multiple columns (or attributes). Various types of aggregations can be performed on an attribute. For example, one aggregation function is a SUM function, which sums all values of a specified attribute. Another aggregation function is an AVG function, which calculates the average of values of an attribute. Other aggregation functions include MIN (to find the smallest value of an attribute), MAX (to find the largest value of an attribute), and so forth.

A special type of aggregation is referred to as a moving aggregate, such as a moving sum, a moving average, and so forth, on some attribute A of tuples of a relation R within a specified moving window. The specified moving window can be an arbitrarily large moving window. Generally, a moving aggregate is an aggregate of an attribute in tuples located within the specified moving window. For example, assume the specified moving window has a size of 15. Given a tuple $T_i$, the moving aggregate is an aggregate of attribute A of all tuples within the specified moving window of 15, namely tuples $T_i - T_{i+14}$.

An issue arises when a moving aggregate is implemented in a parallel RDBMS having multiple data server nodes. A relation R is typically distributed across the multiple nodes. If the specified moving window is large enough, then the moving aggregate may involve tuples from many (e.g., more than two) nodes. One technique is to copy the tuples from the many nodes to one of the nodes so that the moving aggregate can be calculated. If the window is large, then the number of tuples that need to be transferred among the nodes can be quite large, which leads to inefficient database system usage.

SUMMARY

In general, an improved method and apparatus of computing a moving aggregate in a parallel database system is provided. For example, a method of computing a moving aggregate in a parallel database system having plural nodes comprises communicating a value representing an aggregate of tuples stored at a first node to a second node, with the tuples at the first node being involved in a moving aggregate operation. The moving aggregate is calculated using at least tuples at the second node and the value from the first node.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
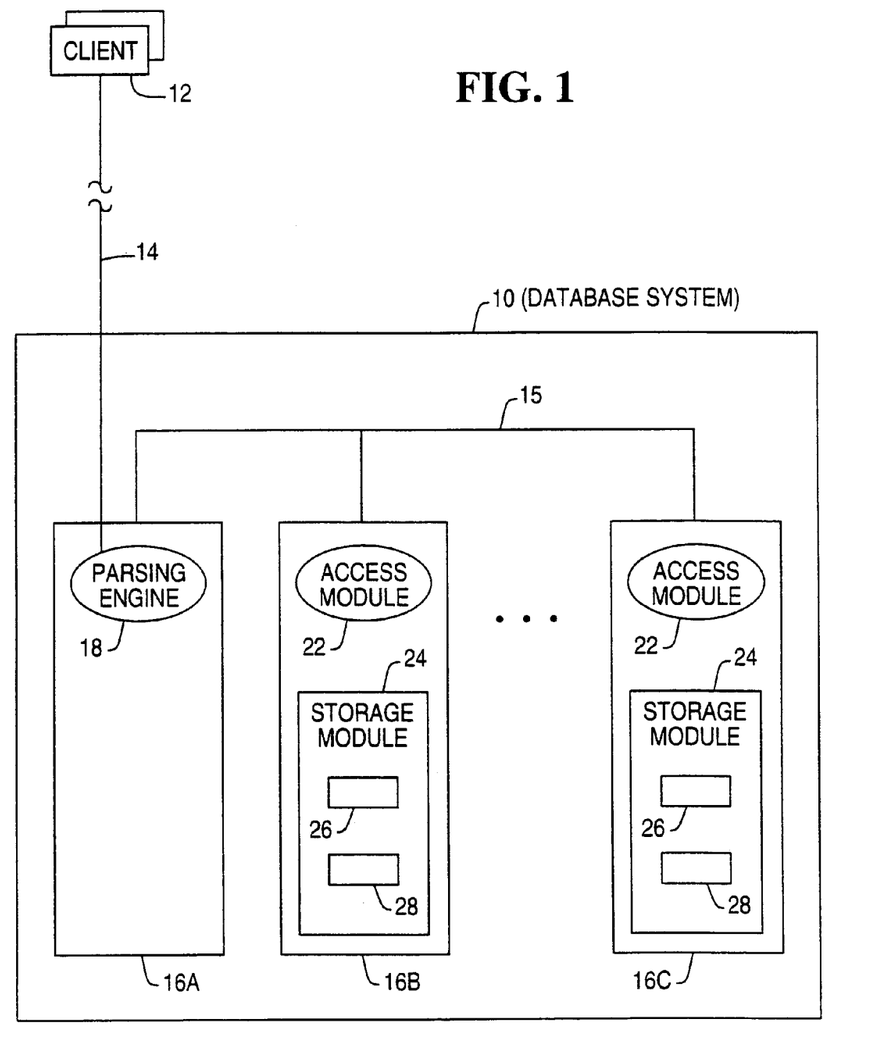
FIG. 1 is a block diagram of an example parallel database system.

FIG. 1 shows a database system 10 that is accessible by one or more client terminals 12 over a network 14. Examples of the network 14 include a local area network (LAN), a wide area network (WAN), or some other type of communications channel. From the client terminal 12, a user or software application is able to issue database queries to extract or manipulate data stored in the database system 10. Such queries are according to a standard database query language, such as the Structured Query Language (SQL) from the American National Standards Institute (ANSI). One version of SQL is the SQL-92 Standard, while another version is the SQL-99 Standard (also referred to as the SQL-3 Standard).

According to one arrangement, the database system 10 includes a plurality of nodes 16A, 16B, and 16C that are coupled together by an interconnect layer 15. The node 16A is coupled to the network 14, and in the illustrated embodiment, includes a parsing engine (PE) or query coordinator 18. The parsing engine 18 interprets a query (such as a query received from the client terminal 12), checks the query for proper SQL syntax, and sends out executable steps to be performed by the nodes 16B, 16C. Alternatively, the parsing engine 18, or multiple instances of the parsing engine 18, is executed at the nodes 16B, 16C.

Each of the nodes 16B, 16C includes an access module 22. One example of the access module 22 is the access module processor (AMP) used in some TARADATA® database systems from NCR Corporation. Each access module 22 is responsible for managing access to a respective portion of a database that is stored in a respective storage module 24. In one embodiment, the access module 22 is implemented as a software module including one or more routines, objects, and so forth.

Each storage module 24 stores portions of one or more tables (or relations) 26, 28. Thus, in the parallel database system 10 shown in FIG. 1, each table 26 or 28 is distributed among plural storage modules 24 that are accessible by corresponding access modules 22.

A query can specify various types of aggregate functions. One type of aggregate function is the moving aggregate function, e.g., a moving sum, moving average, and so forth. A SUM function calculates the sum of a specified attribute in a relation, which can be all instances of the attribute in all tuples (or rows) of the relation (or table). A moving sum, on the other hand, calculates the sum of the attribute in tuples of the relation that are covered within a specified moving window. As used here, the terms "moving aggregate" refers to any aggregate that is performed on an attribute of tuples of a relation within some specified window.

Figure 2:
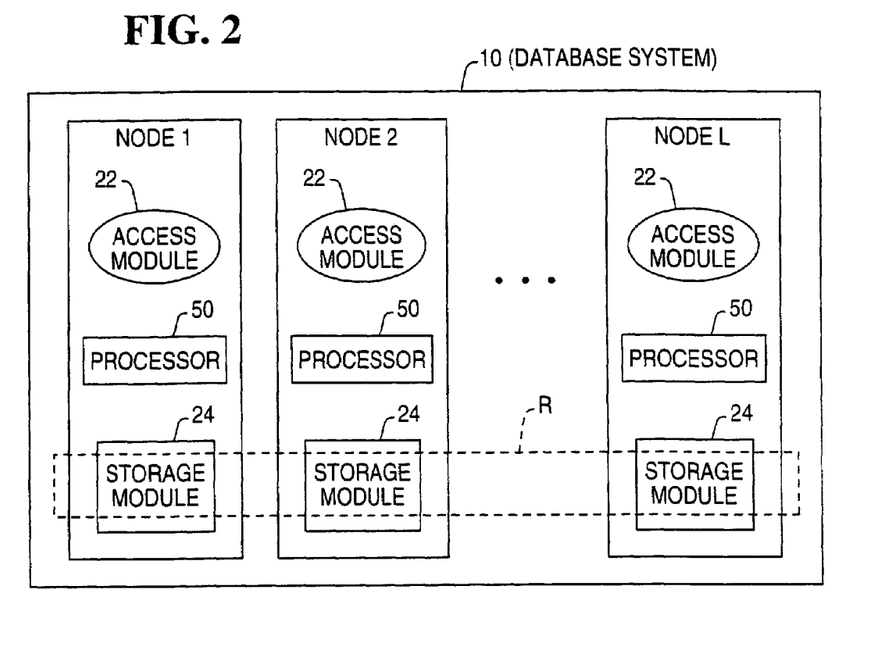
FIG. 2 is a block diagram of nodes of the parallel database system.

As shown in FIG. 2, the database system 10 includes L nodes, referred to as node 1, node 2, . . . , and node L. Each node has a processor 50 (on which a respective access module 22 is executable) and one storage module 24. Although referred to in the singular, the processor 50 can actually include multiple processing devices, such as microprocessors and the like. Also, the storage module 24 can be made up of plural storage devices, such as disk array devices.

As further shown in FIG. 2, a relation R is distributed across the L nodes and stored in respective storage modules 24. Thus, each storage module 24 of a node i contains some predetermined number of rows or tuples of the relation R. For efficient performance, each node stores approximately the same number of tuples of the relation R.

The relation R has a total of N tuples, with $$N = \sum_{i=1}^{L} N_i.$$

For each $1 \leq i \leq L$, node i stores $N_i$ tuples of the relation R. The tuples, namely tuples $T_1, T_2, \ldots, T_N$, are in a globally sorted order according to a sort key K, which is one of the attributes of the relation R. Other attributes are also stored in the relation R. If $B_0=0$ and $$B_i = \sum_{j=1}^{i} N_j (1 \leq i \leq L),$$

then tuples $TB_{i-1}+1$ to $T_{B_i}$ are stored at node i.

Some embodiments of the invention provide an efficient mechanism of calculating a moving aggregate of some attribute A of the relation R within an arbitrary large moving window (with M designating the moving window size).

The moving window can be defined in one of many different ways. A first type of moving window is a forward moving window, with the forward moving window containing tuples after a "current" tuple. A moving aggregate is an aggregate of tuples within a window that is defined with respect to the "current" tuple. Another type of moving window is a backward moving window, with the window containing tuples preceding the current tuple.

Yet another type is a forward and backward moving window, with the moving window containing tuples both preceding and after the current tuple. Yet another type of moving window is an unbounded preceding moving window, which starts at the first tuple of all of the tuples of relation R. Another type of moving window is an unbounded following moving window, which is a moving window that ends at the last tuple of all of the tuples in relation R.

Another type of moving window is a physical moving window, which is a moving window that contains exactly M tuples.

A logical moving window refers to a moving aggregate of values that are based on a sort key K. Assume that a current tuple has a value V for the sort key K. The forward logical moving window contains all tuples whose values for sort key K are between V and V+M (assuming the tuples are kept in ascending order for sort key K). Other kinds of logical moving windows are defined similarly.

A general process of computing a moving aggregate in accordance with some embodiments of the invention is described in connection with FIG. 3. The process described can be performed by one or more software modules in the parallel database system 10, such as the parsing engine 18, access modules 22, and/or other software modules.

The database system 10 first determines (at 102) if a query to perform a moving aggregate has been received. If so, then node i determines (at 104) if the moving window of every tuple at node i covers all tuples at each of the other nodes. In other words, for tuples $T_{B-1}+1$ to $T_{B_i}$, it is determined if the moving window for each of those tuples covers all tuples within another node (referred to as "node y"). Put another way, it is determined if all tuples of node y are within the moving window for each of tuples $T_{B-1}+1$ to $T_{B_i}$ at node i, with node y being different from node i. In the ensuing discussion, this condition is referred to as the "window coverage condition." For each of those nodes that satisfy the window coverage condition referenced above, the aggregate of all the tuples at that node (node y) is calculated (at 106). Note that there can be plural node y's.

The aggregate value from each of these node y's is sent to node i (at 108). For example, if the aggregate is SUM, then the sum of all the tuples is communicated. If the aggregate is AVG, then the average (in fact, sum and count) of all the tuples is calculated.

For the remaining nodes that do not satisfy the window coverage condition but are (partially) within the moving window of at least one tuple at node i, the tuples on each of those nodes (rather than the aggregate value of the tuples) are communicated (at 110) to node i.

Note that a benefit of communicating an aggregate value of tuples at one node to another node is that network bandwidth is used more efficiently. Communicating an aggregate value involves much less data than communicating all tuples at the node.

Figure 4:
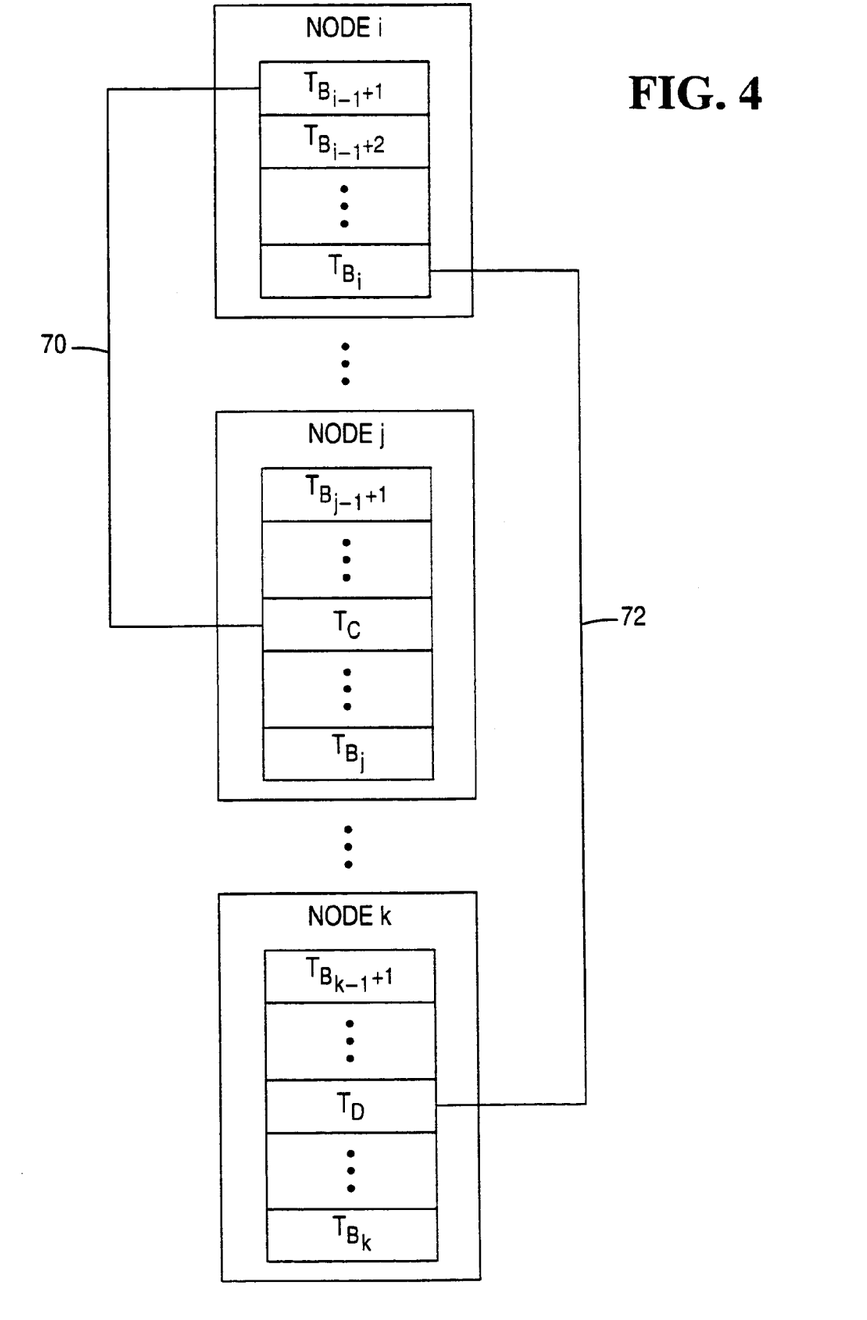
FIG. 4 is a block diagram illustrating storage of tuples of a relation at the nodes of FIG. 2.

Considering a specific node i, $1 \leq i \leq L$, let $C=(B_{i-1}+1)+(M-1)$, and $D=B_i+M-1$. C represents the far edge of the window (of size M) from the first tuple ($T_{B_{i-1}+1}$) of node i. D represents the far edge of the window (of size M) from the last tuple ($T_{B_i}$) of node i. This is illustrated in FIG. 4, where $T_C$ is the last tuple covered within the first window 70, which starts with tuple $T_{B_{i-1}+1}$. $T_C$ is located at node j. $T_D$ is the last tuple covered by the second window 72, which starts with tuple $T_{B_i}$. $T_D$ is located at node k.

For simplicity and without loss of generality, it is assumed that $B_{j-1}+1 \leq C \leq B_j$ and i<j; otherwise a straightforward algorithm can be used in which tuples (instead of aggregate values) from the other nodes are transferred to node i. This latter case occurs when the window M is small enough (e.g., all the tuples needed for calculating the moving aggregate are located at two or less nodes).

As $C \leq D$, it is assumed that $B_{k-1}+1 \leq D \leq B_k$, where i<j<k. For each n (i<n<j), the moving window of every tuple at node i covers all the tuples at node n. In accordance with an embodiment, this is how the window coverage condition is determined at 104 (FIG. 3). For each node n (i<n<j), a sum $S_n$ is sent to node i, where $$S_n = \sum_{q=B_{n-1}+1}^{B_n} A_q, \text{ and } S = \sum_{n=i+1}^{j-1} S_n.$$

The sum $S_n$ represents the sum of attribute A of all tuples at that node (node n). This is the sum calculated at 106 in FIG. 3, assuming that the moving aggregate being calculated is a moving sum.

Figure 3:
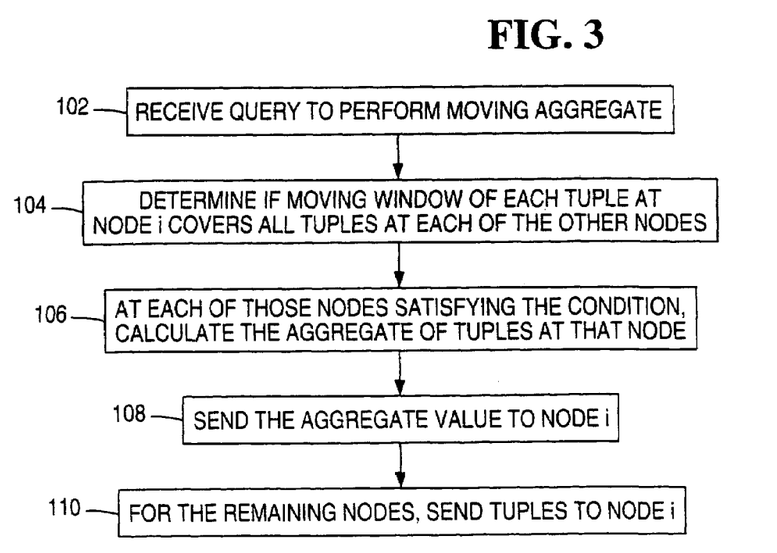
FIG. 3 is a flow diagram of a process of computing a moving aggregate in accordance with an embodiment in the parallel database system of FIG. 1.

Tuples $T_{B_{j-1}+1}$ to $T_D$ (stored at nodes j, j+1, . . . , k) are copied to node i, which corresponds to action 110 in FIG. 3. As an optimization, instead of copying tuples $T_{B_{j-1}+1}$ to $T_C$ from node j to node i, the sum of the values of attribute A of these tuples are copied from node j to node i. This further reduces the amount of tuples that need to be transferred from node to node.

For a tuple $T_p$ ($B_{i-1}+1 \leq p \leq B_i$) at node i, the moving sum for tuple $T_p$ $$= \sum_{q=p}^{p+M-1} A_q$$

$$= \sum_{q=p}^{B_i} A_q + \sum_{n=i+1}^{j-1} \sum_{q=B_{n-1}+1}^{B_n} A_q + \sum_{q=B_{j-1}+1}^{p+M-1} A_q$$

$$= \sum_{q=p}^{B_i} A_q + \sum_{n=i+1}^{j-1} S_n + \sum_{q=B_{j-1}+1}^{p+M-1} A_q$$

$$= \sum_{q=p}^{B_i} A_q + S + \sum_{q=B_{j-1}+1}^{p+M-1} A_q.$$

The first sum $$\left( \sum_{q=p}^{B_i} A_q \right)$$

is obtained from the tuples originally stored at node i, and the third sum $$\left( = \sum_{q=B_{j-1}+1}^{P+M-1} A_q \right)$$

is obtained from the tuples copied to node i (from nodes j, j+1, . . . , k). The sum S is the sum of all aggregates $S_n$ (i<n<j) transferred from each node n.

Figure 5:
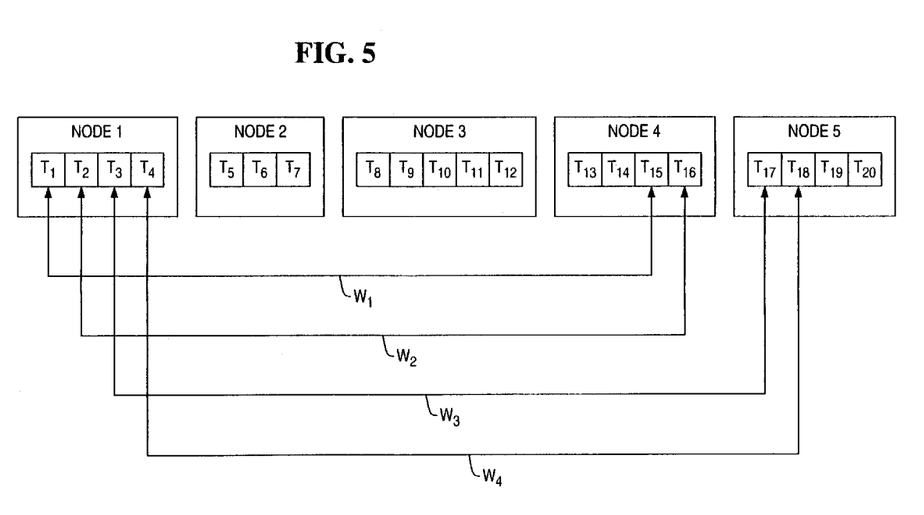
FIGS. 5–8 illustrate examples of calculating moving aggregates in accordance with an embodiment of the invention.
Figure 6:
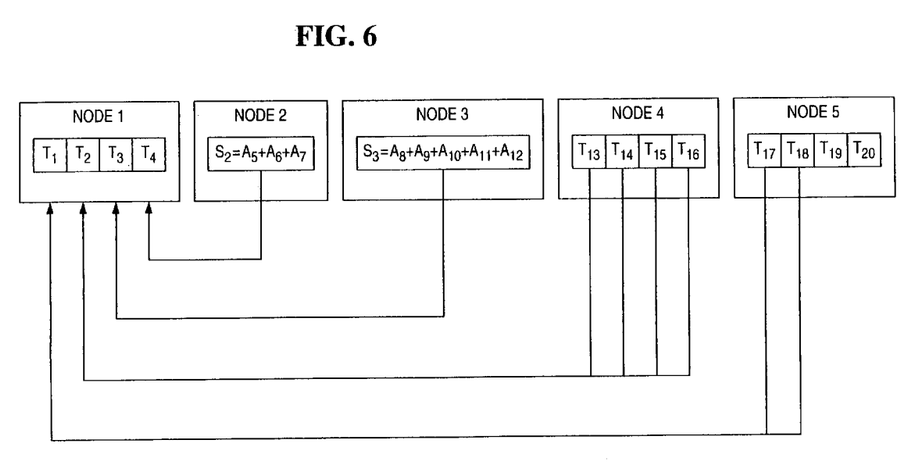

An example is described in connection with FIGS. 5 and 6. The example of FIGS. 5 and 6 involve a physical moving window. As shown in FIG. 5, the parallel RDBMS 10 has five nodes (L=5), namely node 1, node 2, node 3, node 4, and node 5. Assume $N_1=4$, $N_2=3$, $N_3=5$, $N_4=4$, and $N_5=4$. Then, using the equation for $B_i$ provided above, $B_0=0$, $B_1=4$, $B_2=7$, $B_3=12$, $B_4=16$, and $B_5=20$.

Assume also that the moving window size M is 15. For node i=1, C=0+1+15−1=15, and D=4+15−1=18, Also, $B_3+1=13 \leq C \leq B_4=16$, and $B_4+1=17 \leq D \leq B_5=20$, so j=4 and k=5. The moving windows for each tuple (window $W_1$ for tuple $T_1$, window $W_2$ for tuple $T_2$, window $W_3$ for tuple $T_3$, and window $W_4$ for tuple $T_4$) at node 1 covers all the tuples at node 2 and node 3, as shown in FIG. 5. Consequently, node 2 sends the aggregate $S_2$ to node 1, and node 3 sends the aggregate S3 to node 1. The sum S can then be calculated as follows:

$S=S_2+S_3$, where $S_2=A_5+A_6+A_7$, and $S_3=A_8+A_9+A_{10}+A_{11}+A_{12}$.

Further, the tuples $T_{13}$, $T_{14}$, $T_{15}$, and $T_{16}$ are copied from node 4 to node 1, and the tuples $T_{17}$ and $T_{18}$ are copied from node 5 to node 1. At node 1, the moving sums for each of tuples $T_1$, $T_2$, $T_3$ and $T_4$ are calculated. The moving sum for tuple $T_1=A_1+A_2+A_3+A_4+S+A_{13}+A_{14}+A_{15}$. The moving sum for tuple $T_2=A_2+A_3+A_4+S+A_{13}+A_{14}+A_{15}+A_{16}$. The moving sum for tuple $T_3=A_3+A_4+S+A_{13}+A_{14}+A_{15}+A_{16}+A_{17}$. The moving sum for tuple $T_4=A_4+S+A_{13}+A_{14}+A_{15}+A_{16}+A_{17}+A_{18}$.

Figure 7:
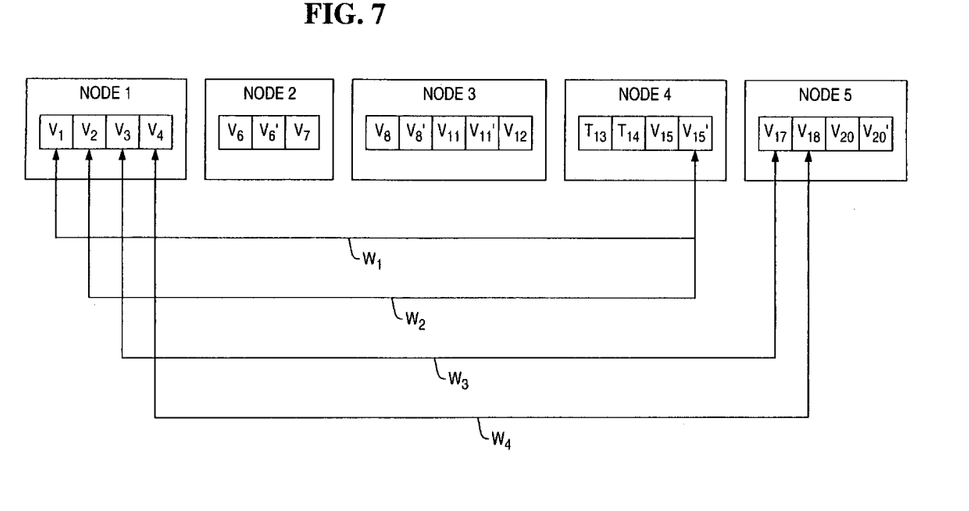
Figure 8:
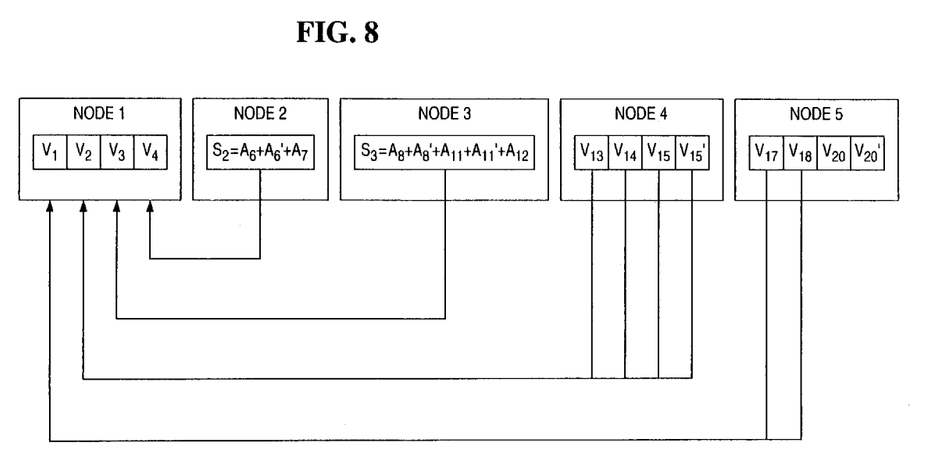

FIGS. 7 and 8 show an example involving a logical moving window. Again, the parallel RDBMS has five nodes. The value $V_x$ represents a tuple whose key value (K) is x. The value $V_x'$ represents another tuple whose key value is x. Thus, as shown in FIG. 7, the values $V_1, \ldots, V_{20}'$ are stored at the five nodes. Suppose the logical moving window size M is equal to 14. Considering node i=1, then $13 \leq 1+M \leq 15$ and $17 \leq 4+M \leq 20$, so j=4 and k=5. The moving window (window $W_1$ for value $V_1$, window $W_2$ for value $V_2$, window $W_3$ for value $V_3$, and window $W_4$ for value $V_4$) for each tuple at node 1 covers all the tuples at node 2 and node 3, as shown in FIG. 7. Consequently, node 2 sends aggregate $S_2$ to node 1, and node 3 sends aggregate $S_3$ to node 1. At node 1, the sum S is calculated as the sum of $S_2$ and $S_3$, where $S_2=A_6+A_6'+A_7$ and $S_3=A_8+A_8'+A_{11}+A_{11}'+A_{12}$. Further, the tuples $V_{13}$, $V_{14}$, $V_{15}$, and $V_{15}'$ are copied from node 4 to node 1. Also, the tuples $V_{17}$ and $V_{18}$ are copied from node 5 to node 1, as shown in FIG. 8. At node 1, the moving sum for tuples $V_1$, $V_2$, $V_3$, and $V_4$ are calculated. The moving sum for tuple $V_1=A_1+A_2+A_3+A_4+S+A_{13}+A_{14}+A_{15}+A_{15}'$. The moving sum for tuple $V_2=A_2+A_3+A_4+S+A_{13}+A_{14}+A_{15}+A_{15}'$. The moving sum for tuple $V_3=A_3+A_4+S+A_{13}+A_{14}+A_{15}+A_{15}'+A_{17}$. The moving sum for tuple $V_4=A_4+S+A_{13}+A_{14}+A_{15}+A_{15}'+A_{17}+A_{18}$.

The mechanism described above for computing moving aggregates can be applied to other types of moving aggregates. Also, although the examples given are for calculating moving sums, the techniques are also applicable for other types of aggregates (e.g., AVG, MIN, MAX, etc.).

Instructions of the various software routines or modules discussed herein (such as access modules 22) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various systems are stored in respective storage devices. The instructions when executed by a respective control unit or processor cause the corresponding system to perform programmed acts.

The instructions of the software routines or modules are loaded or transported to the corresponding system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of computing a moving aggregate in a parallel database system having plural nodes at which a relation having plural tuples are stored, comprising:
   communicating a value representing an aggregate of tuples of the relation stored at a first node to a second node, the tuples at the first node being involved in a moving aggregate operation, each of the first and second nodes having at least one processor; and
   calculating the moving aggregate using at least tuples of the relation at the second node and the value from the first node.

2. The method of claim 1, wherein calculating the moving aggregate comprises calculating the moving aggregate for the tuples of the relation at the second node.

3. The method of claim 2, further comprising:
   communicating tuples of the relation from a third node to the second node.

4. The method of claim 3, further comprising determining that not all the tuples of the relation at the third node are covered within a moving window of each of the tuples of the relation at the second node.

5. The method of claim 4, wherein calculating the moving aggregate also uses the tuples of the relation at the third node.

6. The method of claim 5, further comprising determining that all tuples of the relation at the first node are covered by the moving window for each of the tuples of the relation at the second node.

7. The method of claim 1, wherein calculating the moving aggregate comprises calculating one of a moving sum, moving average, moving minimum, and moving maximum.

8. An article comprising at least one storage medium containing instructions for computing a moving aggregate in a database system having plural nodes, the instructions when executed causing the database system to:
   store tuples of a relation at a first node and at a second node;
   communicate a value representing an aggregate of tuples of the relation stored at the second node to the first node; and
   calculate the moving aggregate using at least tuples at the first node and the value from the second node.

9. The article of claim 8, wherein the instructions when executed cause the database system to calculate the moving aggregate by calculating the moving aggregate for the tuples of the relation at the first node, wherein calculating the moving aggregate for the tuples of the relation at the first node comprises calculating moving aggregate values corresponding to the tuples of the relation at the first node.

10. The article of claim 9, wherein the instructions when executed cause the database system to further communicate tuples of the relation from a third node to the first node.

11. The article of claim 10, wherein the instructions when executed cause the database system to further determine that not all the tuples of the relation at the third node are covered within a moving window of each of the tuples of the relation at the first node.

12. The article of claim 11, wherein the instructions when executed cause the database system to calculate the moving aggregate also using the tuples of the relation at the third node.

13. The article of claim 12, wherein the instructions when executed cause the database system to further determine that all tuples of the relation at the second node are covered by the moving window for each of the tuples of the relation at the first node,
   wherein communicating the value representing the aggregate of the tuples of the relation stored at the second node to the first node is in response to determining that all tuples of the relation at the second node are covered by the moving window for each of the tuples of the relation at the first node.

14. The article of claim 8, wherein each of the first and second nodes includes at least one processor.

15. A database system comprising:
   a plurality of nodes storing respective tuples of a relation; and
   a controller adapted to calculate a moving aggregate for tuples of the relation at a node i,
   the controller adapted to calculate a value representing an aggregate of the tuples of the relation at a node j, j being different from i, and
   the controller adapted to calculate the moving aggregate by using at least tuples of the relation at node i and the value from node j.

16. The database system of claim 15, wherein each of node i and node j includes a processor and a storage module to store respective tuples of the relation.

17. A database system comprising:
   a plurality of nodes to store respective tuples of a relation;
   a controller to:
      communicate a value representing an aggregate of tuples of the relation stored at a first node to a second node, the tuples of the relation at the first node being involved in a moving aggregate operation; and
      calculate a moving aggregate for the moving aggregate operation using at least tuples of the relation at the second node and the value from the first node.

18. The database system of claim 17, wherein each tuple of the relation contains at least one attribute, the controller to calculate the moving aggregate by calculating the moving aggregate of the at least one attribute.

19. The database system of claim 17, wherein the controller comprises modules in the first and second nodes.

20. The database system of claim 17, wherein the tuples of the relation at the first node are covered by a moving window for each tuple of the relation at the second node.

21. The database system of claim 20, wherein the controller is adapted to communicate the value representing the aggregate to the second node in response to the controller determining that the tuples of the relation at the first node are covered by the moving window for each tuple of the relation at the second node.

22. The database system of claim 17, wherein each of the first and second nodes includes at least one processor and a storage module to store respective tuples of the relation.

* * * * *